March 18, 1924.

W. J. SEYFFERT

BALL WINDING MACHINE

Filed April 14, 1921  2 Sheets-Sheet 1

1,486,927

Inventor
William J. Seyffert,
By George L. Prevost
Attorney

March 18, 1924.　　　　　W. J. SEYFFERT　　　　　1,486,927
BALL WINDING MACHINE
Filed April 14, 1921　　　2 Sheets-Sheet 2
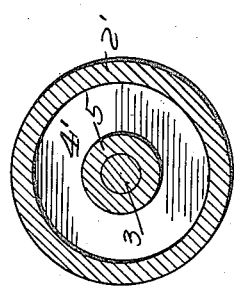
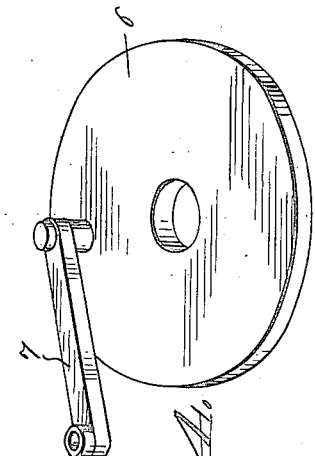
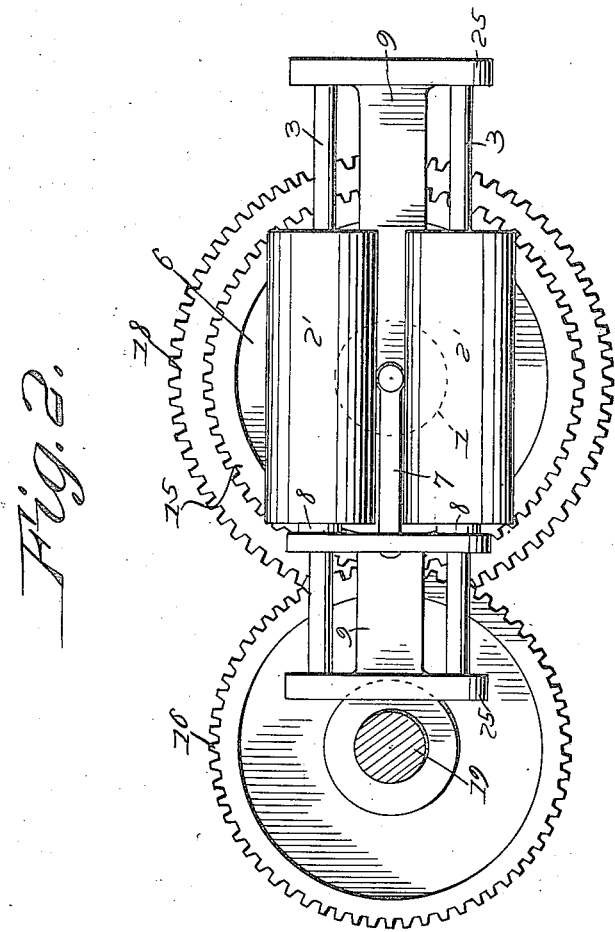
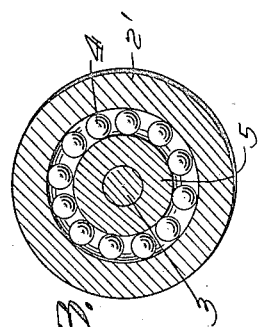
Inventor
William J. Seyffert,
By George K. Provost
Attorney Patented Mar. 18, 1924.

1,486,927

UNITED STATES PATENT OFFICE.

WILLIAM J. SEYFFERT, OF GERMANTOWN, PENNSYLVANIA, ASSIGNOR, BY DIRECT AND MESNE ASSIGNMENTS, TO CORONA MANUFACTURING COMPANY, A CORPORATION OF DELAWARE.

BALL-WINDING MACHINE.

Application filed April 14, 1921. Serial No. 461,400.

*To all whom it may concern:*

Be it known that I, WILLIAM J. SEYFFERT, a citizen of the United States, residing at Germantown, Philadelphia, in the county of Philadelphia and State of Pennsylvania, have invented certain new and useful Improvements in Ball-Winding Machines; and I do hereby declare the following to be a full, clear, and exact description of the invention, such as will enable others skilled in the art to which it appertains to make and use the same.

My invention relates to improvements in ball winding machines, and has for its object to provide mechanism for laying the thread or other material with which the ball is wound on the ball in constantly changing planes, thereby forming finally a perfect sphere.

With the above and other objects in view, which will appear as the description proceeds, the invention consists in the novel features herein set forth, and more particularly pointed out in the appended claims, and shown in the accompanying drawings.

In the drawings;

Fig. 2 is a view taken on line 2—2 of Fig. 1, showing one set of rollers, the yoke, and the driving gears.

Fig. 3 is a view taken on line 3—3 of Fig. 1, showing the ball bearings for the rollers.

Fig. 4 is a view of the crank and connecting rod which cause the rollers to oscillate, and Fig. 5 is a view taken on line 5—5 of Fig. 1 showing an end cross section of one of the rollers.

Similar reference characters indicate identical parts throughout.

Figure 1:
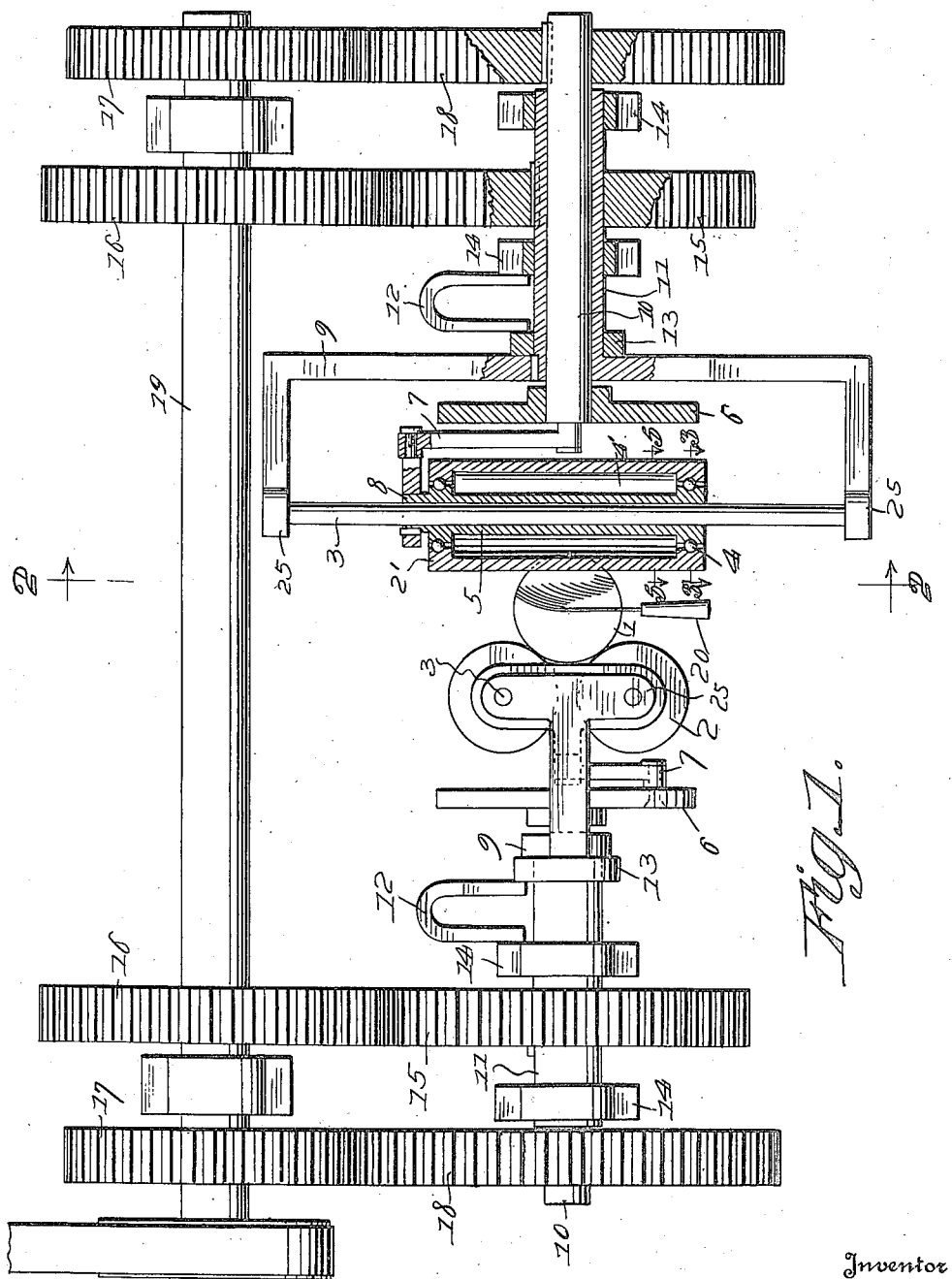
Fig. 1 is a plan view of the machine showing the driving mechanism and the two sets of rollers, one of which is illustrated in cross section.

Referring to the drawings 1 represents a ball core being wound with thread or other suitable material, and which is held and centered by two sets of parallel rollers 2 and 2'. One set of these rollers is positioned at right angles to the other set, and the rollers are mounted on sleeves 5, as shown in Figs. 1 and 5, and have perfect freedom of rotation on their ball bearings 4. The sleeves 5 are slidably mounted on rods 3, which are secured in the ends of the arms 25 of yoke-shaped members 9.

The yokes 9 are rotatably mounted on the ends of hollow shafts 11, which are provided with suitable bearings 14. On the hollow shafts 11 are also mounted gears 15 which are driven by gears 16 mounted on a driving shaft 19.

Rotating within the hollow shaft 11 and projecting from said shaft at each end, is a shaft 10 upon one end of which is mounted a gear 18 which is a little larger than gear 15 and which is a little larger than its driving gear 17 mounted on the main drive shaft 19. On the other end of the shaft 10 is mounted a crank disk 6 to which is eccentrically secured a connecting rod 7 engaging a collar 8 on the sleeve 6 of the rollers 2 and 2'.

Suitable springs 12 mounted so as to engage the bearing 14 and the loose collar 13 tend to hold the rollers 2 and 2' against the ball in process of winding and allow the yokes carrying the rollers to separate as the ball increases in size.

The thread or analogous material is fed on the ball as designated by 20.

The operation of the machine is as follows. A suitable core is placed between the two sets of rollers and the main shaft 19 is set in motion. The shaft 19 rotates the hollow shaft 11 and the yokes 9 carrying the rollers 2 and 2'. The rotation of the yokes 9 causes the ball to turn on an imaginary axis through the center of the shaft 10. At the same time that the ball is revolving on said axis the shaft 10 is revolving at a slower speed than the hollow shaft, due to the difference in the size of the gears as illustrated and heretofore described. The difference in speed causes the crank disks 6 to revolve slower than the yokes 9 and by means of the connecting rods 7 to slide the rollers 2 and 2' on the rods 3. The sliding of the rollers turns the ball on an axis at a right angle to the axis of rotation through shaft 10, and the possibility of this motion is due to the fact, that the rollers are oscillated by the crank arm and crank disk, and are revolved by the frictional contact of the ball.

The resulting effect of these motions is to lay the thread on the ball in constantly changing planes and produces a perfect sphere.

It is apparent that the core of the ball in course of winding, will tend to turn on three axes passing through the center, one axis being on a line extending longitudinally through the center of the shaft 10, another on an axis parallel with the rod 3 of the rolls 2, and a third axis parallel with the rod 3 of the rolls 2'.

It has been found that the best results are obtained when the rollers make one complete oscillation while the yoke 9 is making from eight to ten revolutions. This relation between the oscillation and revolutions can be changed by utilizing different sized gears.

It is obvious that numerous changes may be made in the details of construction without departing from the spirit of my invention.

What I claim and desire to secure by Letters Patent is:—

1. A ball winding machine comprising two sets of rollers oppositely disposed and at right angles to each other, each of said rollers being mounted in a yoke, and means for rotating said yokes and means for oscillating said rollers.

2. A ball winding machine comprising two sets of rollers oppositely disposed and at right angles to each other, said rollers being slidably mounted on suitable bearings secured in rotatable supports, means for rotating said supports and means for oscillating said rollers.

3. A ball winding machine comprising two sets of rollers oppositely disposed and at right angles to each other, said rollers being mounted on rods secured in yokes, means comprising crank disks and connecting rods for sliding said rollers on said rods and means for rotating said yokes.

4. A ball winding machine comprising two sets of rollers oppositely disposed and at right angles to each other, said rollers being slidably mounted in rotatable yokes, means for forcing said yokes toward each other, and for allowing the same to separate when the ball increases in size.

5. A ball winding machine comprising two sets of frictionally driven rollers oppositely disposed and at right angles to each other, said rollers being mounted in a yoke which in turn is mounted on a hollow shaft, a crank disk and connecting rod mounted on a solid shaft, said solid shaft rotating within said hollow shaft, and means for rotating said shafts.

6. A ball winding machine as defined in claim 5 in which the means for rotating the shafts comprise sets of different sized gears so arranged as to permit the hollow shaft to rotate faster than the solid shaft.

7. A core winding machine including means angularly disposed with relation to each other for simultaneously turning a core about three different axes, all intersecting the center of the core.

8. A ball winding machine including a plurality of oppositely disposed rolling elements, having their axes arranged at angles to each other, means for rotating said elements about an axis and means for shifting said rolling elements axially of their axes.

9. A ball winding machine including a plurality of oppositely disposed yokes arranged at angles to each other, means for rotating said yokes about an axis, rods carried by each of said yokes, rolling elements rotatably mounted on said rods, and means for shifting said rolling elements axially on said rods, whereby a core located between the rolling elements will tend to be turned about three intersecting axes.

In testimony whereof I affix my signature.

WILLIAM J. SEYFFERT.